United States Patent
Uy

(10) Patent No.: US 9,311,401 B2
(45) Date of Patent: Apr. 12, 2016

(54) METHOD OF DISPLAYING A SUBJECTIVE SCORE WITH SEARCH ENGINE RESULTS

(75) Inventor: Victor David Uy, Calgary (CA)

(73) Assignees: Victor David Uy, Alberta (CA); Gary Manchoir Ma, Alberta (CA); Owen Man Ma, Alberta (CA)

(\*) Notice: Subject to any disclaimer, the term of this patent is extended or adjusted under 35 U.S.C. 154(b) by 1163 days.

(21) Appl. No.: 12/734,505

(22) PCT Filed: Dec. 20, 2007

(86) PCT No.: PCT/CA2007/002332
§ 371 (c)(1),
(2), (4) Date: May 6, 2010

(87) PCT Pub. No.: WO2008/074152
PCT Pub. Date: Jun. 26, 2008

(65) Prior Publication Data
US 2010/0299317 A1   Nov. 25, 2010

Related U.S. Application Data

(60) Provisional application No. 60/870,882, filed on Dec. 20, 2006.

(51) Int. Cl.
G06F 7/00 (2006.01)
G06F 17/30 (2006.01)

(52) U.S. Cl.
CPC ................ G06F 17/30864 (2013.01)

(58) Field of Classification Search
USPC ................................ 707/722, 723
See application file for complete search history.

(56) References Cited

U.S. PATENT DOCUMENTS

| | | | |
|---|---|---|---|
| 6,012,053 A | 1/2000 | Pant et al. | |
| 6,327,590 B1 * | 12/2001 | Chidlovskii et al. | 707/734 |
| 7,024,404 B1 | 4/2006 | Gerasoulie et al. | |
| 8,495,081 B2 * | 7/2013 | Junginger | G06Q 10/00 705/26.7 |

(Continued)

FOREIGN PATENT DOCUMENTS

WO   WO 2006/102122   9/2006

OTHER PUBLICATIONS

U.S. Appl. No. 12/734,504, filed May 6, 2010; Uy.
(Continued)

*Primary Examiner* — Hexing Liu
(74) *Attorney, Agent, or Firm* — Nixon & Vanderhye P.C.

(57) ABSTRACT

Methods and apparatus are provided for associating scores with search results obtained from a search engine so that the scores can be displayed with the search results. A search of electronic documents, such as webpages, is requested and a set of search results obtained. Each search result in the set references an electronic document. Using the search results, a database containing scores determined for electronic documents is searched to determine whether scores have been determined for the electronic documents referenced by the search results. The scores stored in the database are based on people's ratings of the electronic document corresponding to the score. If a score has been determined for an electronic document referenced by one of the search results, that score is associated with the search result and the search results are then displayed with any scores associated with the search results.

23 Claims, 11 Drawing Sheets

(56) References Cited

U.S. PATENT DOCUMENTS

| | | | |
|---|---|---|---|
| 2002/0069190 A1* | 6/2002 | Geiselhart | 707/1 |
| 2004/0024752 A1* | 2/2004 | Manber et al. | 707/3 |
| 2005/0071328 A1* | 3/2005 | Lawrence | 707/3 |
| 2005/0131866 A1* | 6/2005 | Badros | G06F 17/30867 |
| 2005/0144158 A1* | 6/2005 | Capper et al. | 707/3 |
| 2005/0216457 A1* | 9/2005 | Walther | G06F 17/30696 |
| 2005/0262050 A1 | 11/2005 | Fagin et al. | |
| 2006/0212441 A1 | 9/2006 | Tang et al. | |
| 2006/0235860 A1* | 10/2006 | Brewer et al. | 707/100 |
| 2007/0005590 A1* | 1/2007 | Thrasher | 707/5 |
| 2008/0235189 A1* | 9/2008 | Rayman | G06F 17/30867 |
| 2009/0046101 A1* | 2/2009 | Askey | G06Q 30/02 345/470 |
| 2009/0063543 A1* | 3/2009 | Martin | G06F 17/30749 |
| 2012/0123855 A1* | 5/2012 | Gu | G06F 17/3064 705/14.46 |
| 2013/0204863 A1* | 8/2013 | Rigole | G06F 17/30864 707/722 |

OTHER PUBLICATIONS

International Search Report for PCT/CA2007/002332, mailed Apr. 28, 2008.

Written Opinion for PCT/CA2007/002332, mailed Apr. 28, 2008.

* cited by examiner

METHOD OF DISPLAYING A SUBJECTIVE SCORE WITH SEARCH ENGINE RESULTS

This application is the U.S. national phase of International Application No. PCT/CA2007/002332 filed 20 Dec. 2007 which designated the U.S. and claims priority to U.S. Provisional Application No. 60/870,882 filed 20 Dec. 2006, the entire contents of each of which are hereby incorporated by reference.

This invention is in the field of information retrieval systems and in particular systems and methods for providing an independent scoring of electronic documents.

BACKGROUND

The World Wide Web provides a large collection of interconnected content in the form of electronic documents, images and other media content. Over the years the web has grown to an immense size and contains webpages and other content on just about every subject a person could think of. As a result of its growth to such an immense size, locating content on the web has become of primary concern with the result that there are numerous search services now available.

Many of these search services take the form of a search engine, where a user can input a search query in the form of one or more search terms with connectors placed in between the terms. The search engine then takes the search query and attempts to match it to webpages on the web that have been indexed by the search engine. By matching the search query to a number of different webpages, the search engine generates a list of search results and returns the list of search results to the user. Each search result in the list typically includes a link that a user can use to access the located webpage or other located electronic document.

The search engines typically locate what they consider to be "relevant" webpages by using specially created indexes and/or databases where the relevancy of a document identified in an index or database is based on terms from the search query being present. The located documents are then further ranked so that the "best" results appear higher in the list of search results and the "poorer" results appear closer to the bottom or end of the list of search results.

Additionally, it has become a fairly big business to consult on website design in order to use tricks and loopholes in the more common algorithms used by search engines to have a webpage ranked higher in search results than another webpage which might be as good qualitatively if not better than the higher ranked webpage.

The ranking of the located search results is typically done using algorithms that often base the ranking on how closely the search query matches the located webpages (usually on how the webpage is described in the search engine's index or database) and other criteria. In some cases, because the search engines only receive a search query containing search terms, the ranking of the webpages located by a search engine can be heavily based on the occurrence of the search terms in the index or database identifying the webpage, however, other factors can also be taken into account, such as whether the domain name matches the search query or whether a webpage is a sponsored link that has paid the search engine to be ranked higher.

While many of these algorithms may be good at ranking located webpages by the criteria of "relevancy" used by the algorithms, this ranking is based on objective factors. They are typically unable to determine which of the located webpages may be qualitatively "better" than other located webpages, which is often a subjective quality assessment that cannot be assessed on a purely objective basis. By relying on objectively defined parameters such as the number of times a search term appears on a webpage or whether the domain name contains one or more of the terms in the search query these algorithms fail to provide rankings of the located webpages based on the subjective quality of a webpage. Often, even though a webpage may use commonly used search terms and therefore typically rank quite highly in a list of search results, the overall quality of the webpage may not be that high or as good as another site that does not use the search terms as frequently.

While many search engines do not even attempt to address how qualitatively good search results may be, some search engines do use algorithms that attempt to determine which search results are qualitatively "better" than other search results. One example of this is the algorithm disclosed by U.S. Pat. No. 6,285,999 to Page, that uses the number of links between webpages to try to assess the quality of a webpage. The algorithm is based on the underlying theory that websites that are linked to by a relatively large number of other unrelated websites are more likely to be qualitatively "better" than websites that have few other websites linking to it. Even in trying to determine how subjectively "good" a website might be, this algorithm is still limited to using objectively measurable factors (in this case the amount of links) to attempt to approximate how subjectively "good" a webpage may be.

However, while the conventional search engines may not be able to produce subjectively ranked results, conventional search engines such as Google™, Yahoo! Search™, Excite™, etc., have massive resources invested in their infrastructures and equipment including the compilation of massive indexes of webpages and other electronic documents. Hours and hours of effort and incredible amounts of funding and research have went into the creation of these search engines and their search engine indexes. In addition, because of the ever changing nature of the Internet and in particular the World Wide Web these search indexes must be constantly maintained and updated. Operating and maintaining a popular search engine is a huge undertaking. A popular search engine might index hundreds of millions of webpages and respond to millions and millions of search queries a day. To start from scratch and create a search engine for the World Wide Web or other parts of the internet is a huge undertaking that will also have very savvy and well funded competition from other search engines. While conventional search engines may not allow much subjectivity to factor into their ranking of search results, their searches do encompass huge amounts of webpages that are compiled in massive search indexes.

There is a need to provide some type of subjective rating of the quality, popularity or other criteria for search results; a rating that reflects how "good" a webpage or other electronic document may be, while still being able to use the search indexes and massive searching ability of conventional search engines.

SUMMARY OF THE INVENTION

It is an object of the present invention to provide a method and apparatus that overcomes problems in the prior art.

In a first aspect, a method for displaying a score with a search result is provided. The method comprises: requesting a search from a search engine using a search query having at least one search term; receiving a set of search results from the search engine in response to the search query, each search result referencing an electronic document, the set of search results in an order based on a ranking of the search results by the search engine; displaying the set of ranked search results in the order; and displaying at least one score along with the set of search results, each score associated with an electronic document referenced by one of the search results and displayed with the one of the search results. Each score is determined independently from the ranking of the search results by the search engine.

In a second aspect, a data processing system for displaying a score with a search result is provided. The data processing system comprises: at least one processor; a memory operatively coupled to the at least one processor; a display device operative to display data; and a program module stored in the memory and operative for providing instructions to the at least one processor, the at least one processor responsive to the instructions of the program module. The program module is operative for: requesting a search from a search engine using a search query having at least one search term; receiving a set of search results from the search engine in response to the search query, each search result referencing an electronic document, the set of search results in an order based on a ranking of the search results by the search engine; displaying the set of search results in the order on the display device; and displaying at least one score along with the set of search results on the display device, each score associated with an electronic document referenced by one of the search results and displayed with the one of the search results. Each score is determined independently from the ranking of the search results by the search engine.

In a third aspect, a method of associating scores determined for electronic documents with search results obtained from a search engine that reference the electronic documents is provided. The method comprises: providing a database storing scores determined for electronic documents; obtaining a set of search results, the set of search results obtained from a search engine using a search query having at least one search term, each search result referencing an electronic document; and for each search result in the set of search results, searching the database for any score determined for the electronic document referenced by the search result and if a score has been determined for the electronic document referenced by the search result obtaining the score value and associating it with the search result. The database is independent from the search engine.

Online communities in the form of social networks have become popular on the internet. Online social networks allow members to interact and make connections with other members in the online community; either by joining them together in subgroups or connecting members directly as peers. Common examples of these online social networks include Friendster™ and MySpace™, which allow users to link to other users, share information about themselves and send messages to each other. These existing online social networks are primarily focused on members meeting other members through linking to pages the members create, bulletin boards or direct messaging services. Often these sites are focused on geographical locations so that people online can meet people who live near them.

By structuring an online social network so that the members of the social network can rate electronic documents such as webpages and other electronic content, a subjective rating of an electronic document can be obtained. Because these members form an online community, the online community can be structured so that not only can the members rate electronic documents, but the members in the online network can also rank other members. In this manner, not only can subjective ratings of electronic documents such as webpages or other electronic content be given a weighted rating, based on a subjective quality of how good an electronic document is, in the opinions of the members in the online community, but the members ratings of the electronic document can be further weighted based on how the online community views the members who are doing the rating. A member that is highly rated by other members in the online community will have more weight placed on his or her ratings of an electronic document than another member that is rated much lower by the online community.

Rather than attempting to indirectly approximate the subjective quality of an electronic document such as a webpage, by looking at objectively measurable attributes that a computer system can measure and evaluate, the present apparatus and methods allow a rating to be determined for electronic content that is directly based on the subject quality assessment of the electronic content by an online community.

In one aspect, a method and apparatus is provided that allows subjectively determined scores to be associated with search results that have been obtained from a search engine that have already been ranked by the search engine using its own ranking algorithm. A search of electronic documents, such as webpages, is requested from a search engine and then a set of search results is obtained from the search engine. This allows a conventional search engine to be used and the extensive searching capabilities of these conventional established search engines to be utilized. Each search result in the set references an electronic document. Using the search results, a database containing scores determined for electronic documents is searched to determine whether scores have been determined for the electronic documents referenced by the search results. The scores stored in the database are based on subjective ratings of the electronic document corresponding to the score. If a score has been determined for an electronic document referenced by one of the search results, that score is associated with the search result and the search results are then displayed with any scores associated with the search results.

In this manner, a conventional search engine can be used utilized to locate relevant electronic documents and then any scores determined for the located electronic documents can be displayed with the search results, allowing the user to see an assessment of the search results that is independent from the search engine's ranking of the search results.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
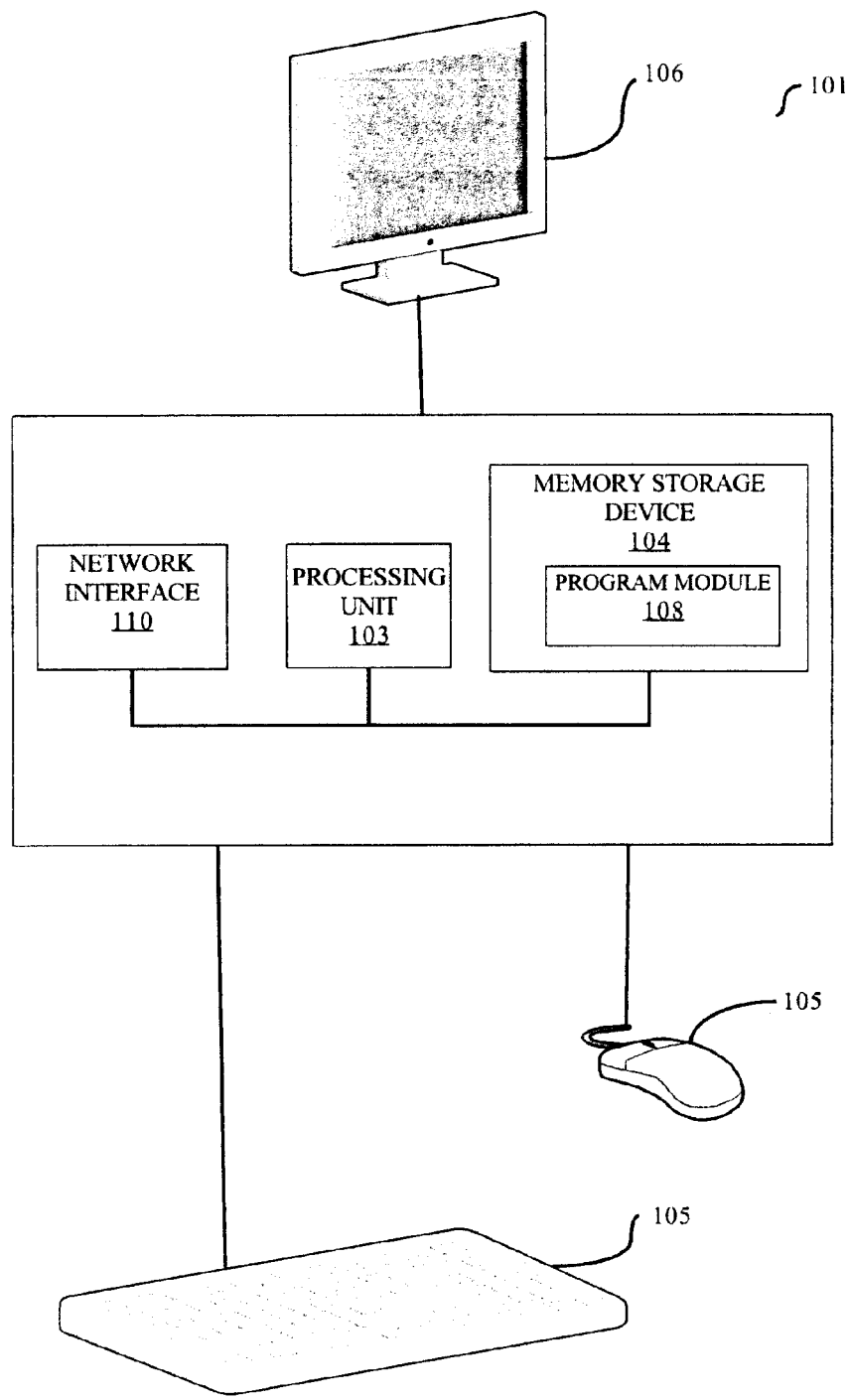
FIG. 1 is schematic illustration of a conventional data processing system capable of implementing the methods of the present invention.

FIG. 1 illustrates a data processing system 101 suitable for supporting the operation of the present invention. The data processing system 101 could be a personal computer, workstation, server, mobile computing device, cell phone, etc. The data processing system 101 typically comprises: at least one processing unit 103; a memory storage device 104; at least one input device 105; a display device 106; a program module 108 and a network interface 110.

The processing unit 103 can be any processor that is typically known in the art with the capacity to run the provided methods and is operatively coupled to the memory storage device 4 through a system bus. In some circumstances the data processing system 101 may contain more than one processing unit 103. The memory storage device 104 is operative to store data and can be any storage device that is known in the art, such as a local hard-disk, etc. and can include local memory employed during actual execution of the program code, bulk storage, and cache memories for providing temporary storage. Additionally, the memory storage device 104 can be a database that is external to the data processing system 101 but operatively coupled to the data processing system 101. The input device 105 can be any suitable device suitable for inputting data into the data processing system 101, such as a keyboard, mouse or data port such as a network connection and is operatively coupled to the processing unit 103 and operative to allow the processing unit 103 to receive information from the input device 105. The display device 106 is a CRT, LCD monitor, etc. operatively coupled to the data processing system 101 and operative to display information. The display device 106 could be a stand-alone screen or if the data processing system 101 is a mobile device, the display device 106 could be integrated into a casing containing the processing unit 103 and the memory storage device 104. The program module 108 is stored in the memory storage device 104 and operative to provide instructions to processing unit 103 and the processing unit 103 is responsive to the instructions from the program module 108.

The network interface 110 allows the data processing system 101 to be connected to a computer network such as an intranet or the internet. This network interface 110 could be an Ethernet card, modem or other line based network system or a wireless connection such as CDPD, Bluetooth, 802.11, or other suitable network.

Although other internal components of the data processing system 101 are not illustrated, it will be understood by those of ordinary skill in the art that only the components of the data processing system 101 necessary for an understanding of the present invention are illustrated and that many more components and interconnections between them are well known and can be used.

Additionally, the invention can take the form of a computer readable medium having recorded thereon statements and instructions for execution by a data processing system 101. For the purposes of this description, a computer readable medium can be any apparatus that can contain, store, communicate, propagate, or transport the program for use by or in connection with the instruction execution system, apparatus, or device.

Overview of System

Data processing system 101 typically runs a browsing application, such as Microsoft's Internet Explorer™, Mozilla Firefox™, Apple Safari™, Netscape Navigator™, Opera™ or other browser program. In one aspect, a plugin is used with the browsing application to implement some of the disclosed methods.

Figure 2:
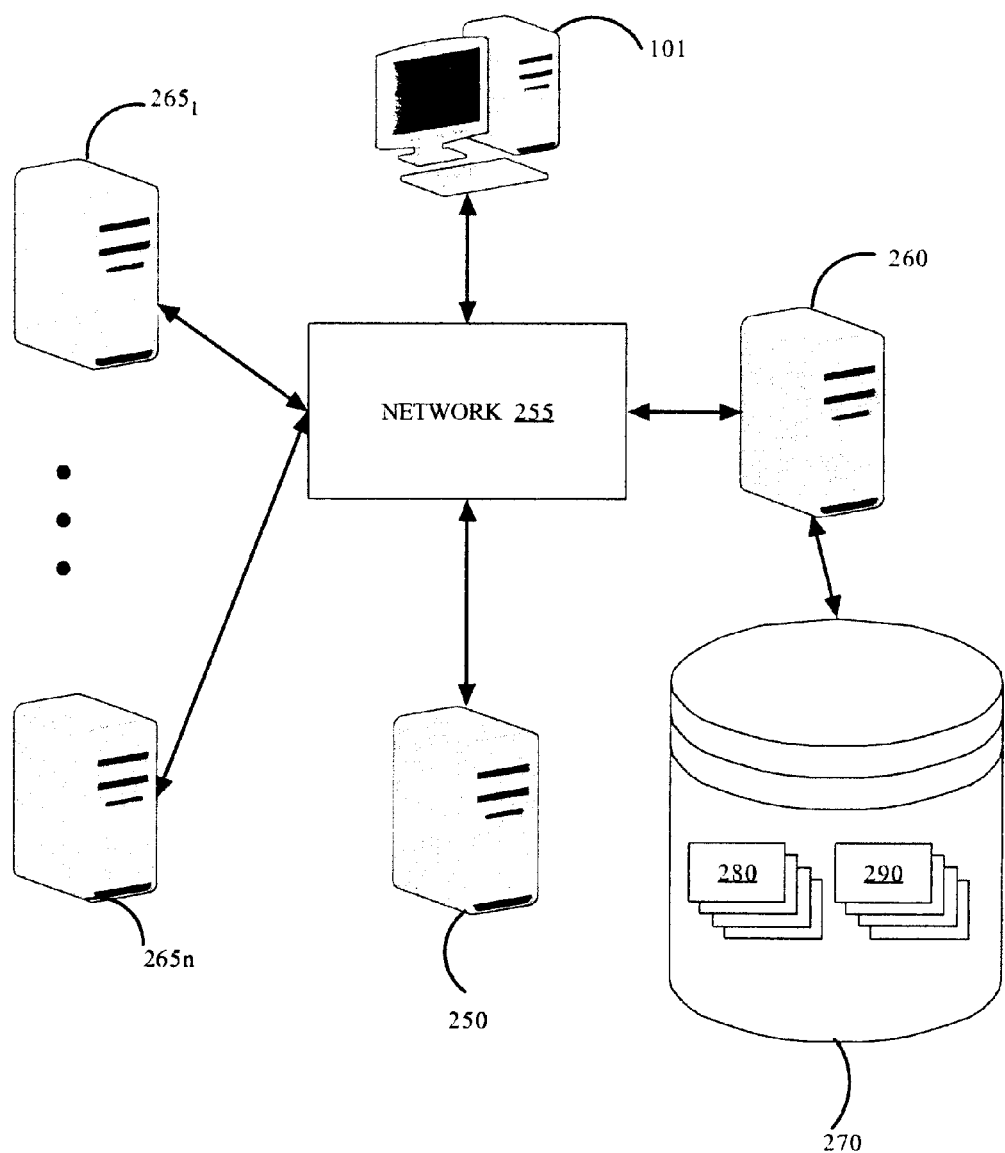
FIG. 2 is schematic illustration of a network configuration wherein a data processing system operative to implement the provided methods in accordance with the present invention is connected over a network to a plurality of servers operating as a search engine.

FIG. 2 illustrates a network configuration wherein the data processing system 101 is connected over a network 255 to at least one search engine server 250. The network 255 can comprise a single network such as the internet or it could comprise a plurality of networks such as a wireless network, a wired network, etc. While in one aspect, the system is suitable for use with the Internet, it should be understood that the network 255 could comprise other types of networks, such as an intranet or other suitable network.

A plurality of content servers $265_1$ to $265_N$ are configured to act as web servers and provide data and electronic content, generally although not necessarily in the form of websites containing webpages, to the data processing system 101. The data processing system 101 can access any of the content servers 265 to view electronic documents, such as webpages, contained on the content servers 265. Typically, the data processing system 101 uses a web browser application to access any of the content servers $265_1$ to $265_N$, which are web servers and the electronic documents accessed on any of the content servers 265 are generally files in a markup language which the browser displays as a web site and web pages on the data processing system 101.

A search engine server 250 is provided, configured to provide search result data to the data processing system 101. Well-known search engines include Google™, Yahoo! Search™, MSN Search™, Ask.com™, but there are many other search engines and many may be sufficient for search engine server 250. Typically, a search query transmitted to the search engine server 250 from the data processing system 101 is used by the search engine server 250 to locate a plurality of electronic documents on the content servers 265. For example, the search results my be a list of electronic documents located by the search engine 250 that resides on the content servers 265 with links to the content servers 265 to allow a user using the data processing system 101 to access the located electronic document. Typically, the search engine server 250 accesses various search indexes that are populated with: links to electronic documents; meta-data describing the content of indexed electronic documents; or other meta-data and uses these electronic document indexes to construct a list of search results, as is known in the art. As is common in the art, these electronic document indexes are typically populated using a web crawler.

Once the search engine server 250 has located a number of search results, a list of search results is passed back to the data processing system 101 to the user. Generally although not necessarily; each search result in the list of search results comprises a link to an electronic document located on one of the content servers 265.

A central server 260 is provided and is operatively connected to a score database 270. The score database 270 contains a plurality of member records 280 and a plurality of rating records 290.

Figure 3:
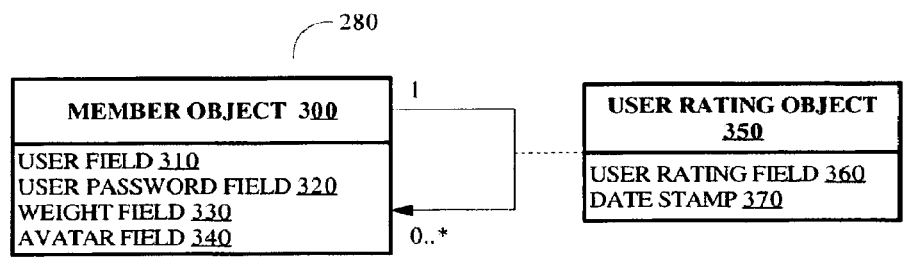
FIG. 3 is a schematic illustration of a member record.

A number of users (or members) form a member set that has access to the central server 260. Each user in the set of members will have a member record 280 associated with him or her and stored in the score database 270. In one aspect, member record 280 is in the format of a member object 300 as shown in FIG. 3. Each member object 300 corresponds with one of the members in the member set and is the record used by the member as they are accessing the central server 260. Each member object 300 comprises: a user field 310 that contains an identifier (i.e. the name or a user name of the user) which identifies the specific user or member that corresponds to the member object 300; a user password field 320 that contains the password of the user or member; a weight field 330, that indicates a weighting factor to be applied to any rating made by the user; and an avatar field 340 that contains a link to a graphic the member is using for his or her avatar.

Each member object 300 can be associated with one or more other member objects 300. This occurs when one member rates another member in the member set. The association is defined by a user rating object 350 that has a user rating field 360 which contains the rating that the one user has given to the other member. In this manner, a member can rate other members in the member set and this rating will become a factor in that other member's rating contained in the weight field 330 of the member object 300 corresponding to the other member.

In addition to the score database 270 storing a number of member records 280, the score database 270 also stores a number of document records 290. In one aspect, document record 290 is in the format shown in FIG. 4. The document record 290 contains a document object 400 associated with zero (0) or more document rating objects 405. Each document object 400 corresponds to an electronic document. The electronic document could be a webpage, website, graphic image, sound recording movie recording or other electronic content located on a content server 265 and each document rating object 405 associated with the document object 400 corresponds to a rating of the electronic document by a member in the member set.

Typically, each document object 400 comprises: a title field 410, identifying the title of the electronic document; a graphical representation 415 that provides a graphical representation of the electronic document corresponding to the document object 400; an address field 420 that identifies the location of the electronic document on the content servers 265 typically using the uniform resource locator address (URL address) or the uniform resource identifier address (URI address); optionally, a category field 460, that identifies a category that the electronic document has been classed in; and a score field 470, that contains a score value determined for the electronic document and based on how members in the member set have rated the electronic document.

Additionally, each document object 400 is associated with one or more document rating objects 405 where each document rating object 405 holds a rating assigned to the page or other piece of content by a member in the member set. Each document rating object 405 typically comprises: a document rating field 440, which contains a rating of the electronic document made by a member; a comment field 450, containing any comments (typically in a text string) that the member might have made regarding the electronic content; and a date stamp 455, indicating the date and/or time the member rated the electronic document.

The document rating field 440 is used to store a rating of the electronic document by the member in the associated member object 300. This document rating field 440 reflects the associated member's opinion or judgment of the electronic document. The document rating field 440 typically comprises a rating from 1 to 10 with 10 being the highest and 1 being the lowest, however, any sufficient rating system could be used, such as numeric, alphanumeric (i.e. excellent, good, average, poor, horrible), symbolic (i.e. four stars, two thumbs up) or any other suitable rating system.

The comment field 450 can hold a comment made by the associated member regarding the electronic document identified in the address field 420 of the associated document object 400. The comment can be a long string of text containing a comment about the site made by the creator.

The score field 470 in the document object 400 shows a rating of the web page or other content identified by the address field 420. The rating contained in the score field 470 is based on the rating contained in the content rating field 440 of all of the associated document rating objects 405 with each rating being further weighted with the weight contained in the weight field 330 of the member object 300 associated with the member who provided the rating in the document rating field 440. In this manner, an electronic document can be rated by a number of members with each rating assigned by a member being further weighted based on how other members have personally rated that member.

It is to be understood that the member record data object 300 and the document object 400 and document rating object 405 are only illustrative and that other formats with different fields may be used for the member records 280 and document records 290 contained in the score database 270.

Rating an Electronic Document

Each document record 290 stored in the score database 270 relates to a rating a specific member has assigned to an electronic document whether the electronic document is a web site, web page or other item of electronic content on one of the content servers 265. As a user browses electronic documents, the user can rate and comment on any of the electronic documents they care to.

Figure 5:
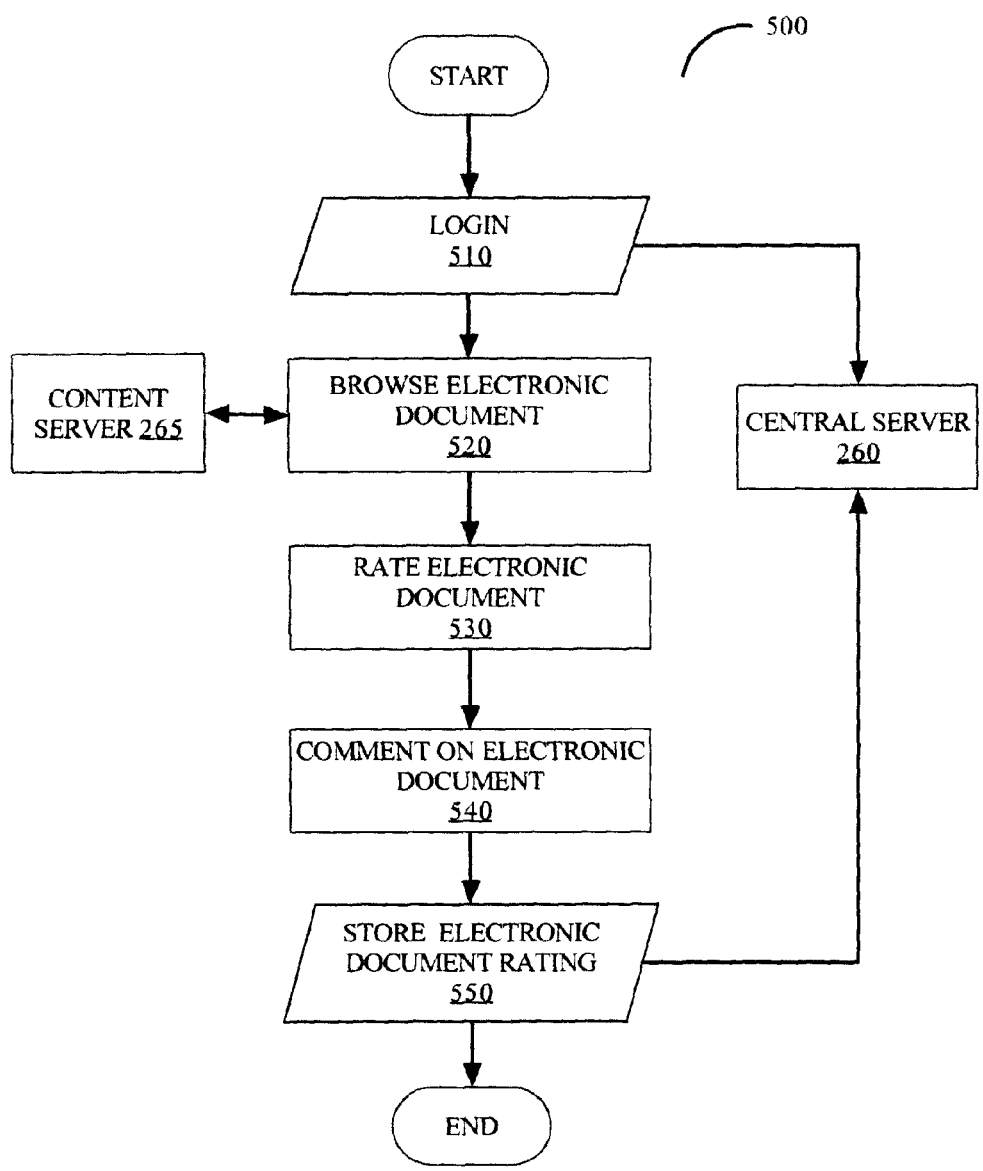
FIG. 5 is a flowchart of a method for a user to rate an electronic document the user has reviewed.

FIG. 5 illustrates a flowchart of a method 500 of a user rating an electronic document the member has reviewed. In one aspect, method 500 is implemented by a plug-in to a browser application on a data processing system 101 being operated by the member. In another aspect, the method may be integrated into the browser application itself. The method 500 begins with a member logging into the central server 260 at step 510. Typically, this involves the user entering a unique username and password into their data processing system 101 so that the data processing system 101 can transmit this information to the central server 260. The user typically has previously registered with the central server 260 and a member record 280 has been created corresponding to the user making the user a member of the member set. The username and password that is transmitted to the central server 260 is used to access the member record 280 in the score database 270 that corresponds to the user. This allows the central server 260 to determine which member from the set of members is accessing the central server 260.

The user can then browse electronic documents on various content servers 265 at step 520. The electronic documents browsed by the user are contained on one of the content servers 265. The user can either find the electronic document he or she is browsing by either accessing the content server 265 directly (such as by using a URL or a hyperlink to access the content on the content server 265) or by using a search engine, such as the search engine server 250, as is commonly known in the art, to locate the electronic content.

The user can continue to browse different electronic documents at step 520 until he or she discovers an electronic document they would like to rate. In one aspect, when a user rates a specific webpage on a site, the entire site is rated and associated with the rating. In another aspect, when the user rates a specific webpage in a site, the rating only applies to the specific page and not the site itself.

The electronic document can be any electronic content that can be uniquely identified by an address (such as a URL address or URI address), i.e. a specific webpage, graphic, picture, file, link, etc. can be rated and/or a comment provided for by the user for that electronic document alternatively the electronic document can be a website that has a number of webpages all contained on a content server 265.

Figure 7:
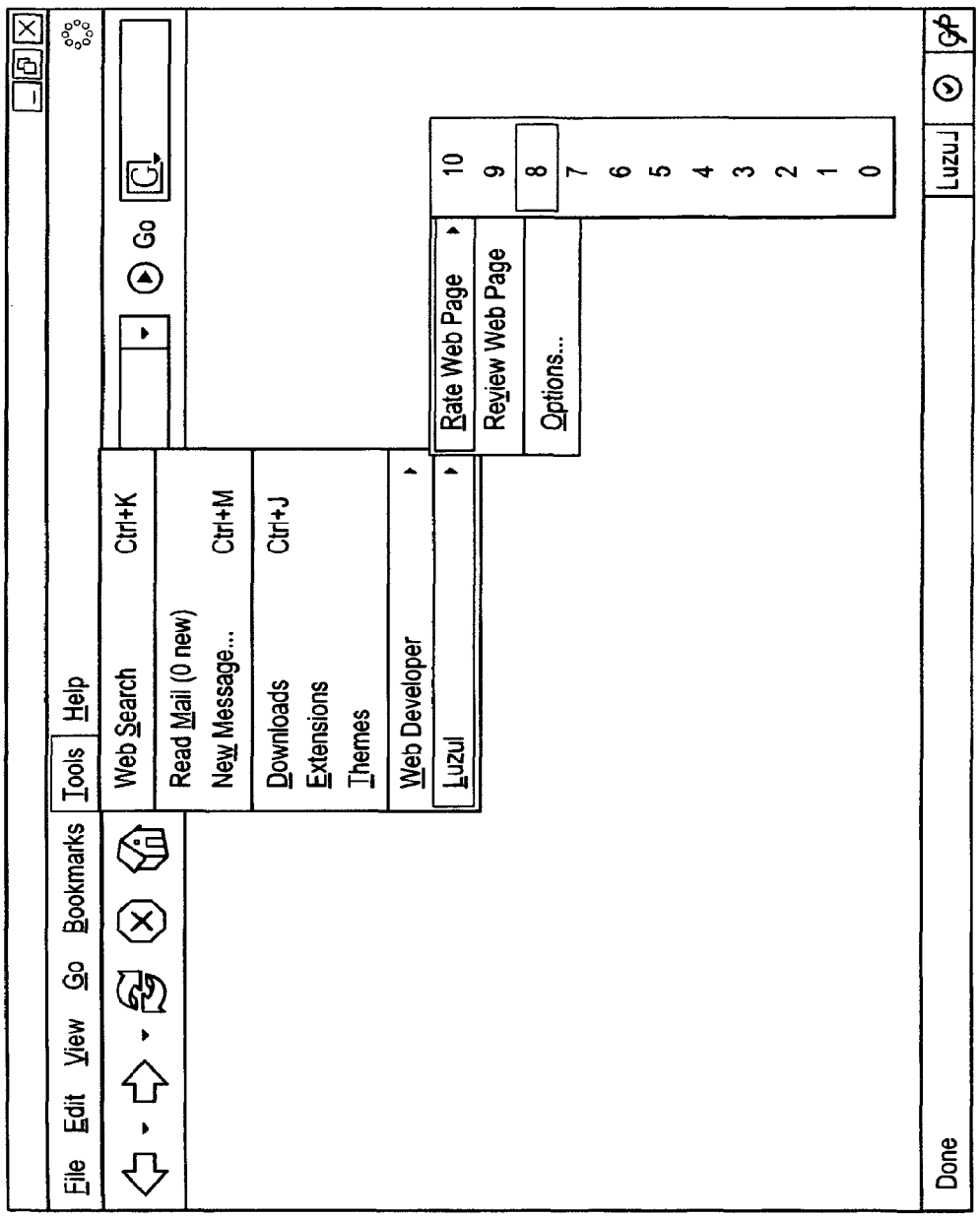
FIG. 7 is a screen shot of an exemplary browser for ranking a webpage being viewed.

The user then rates the electronic document at step 530. FIG. 7 illustrates a screen shot on one embodiment of a web browser allowing a user to rate an electronic document that is a webpage being viewed by the browser by selecting a drop down menu and selecting a rating from 0 through 10, with 0 being the lowest and 10 being the highest.

Referring again to FIG. 5, the user can, optionally, also make a comment regarding the page or content at step 540 by submitting a typed comment.

Figure 4:
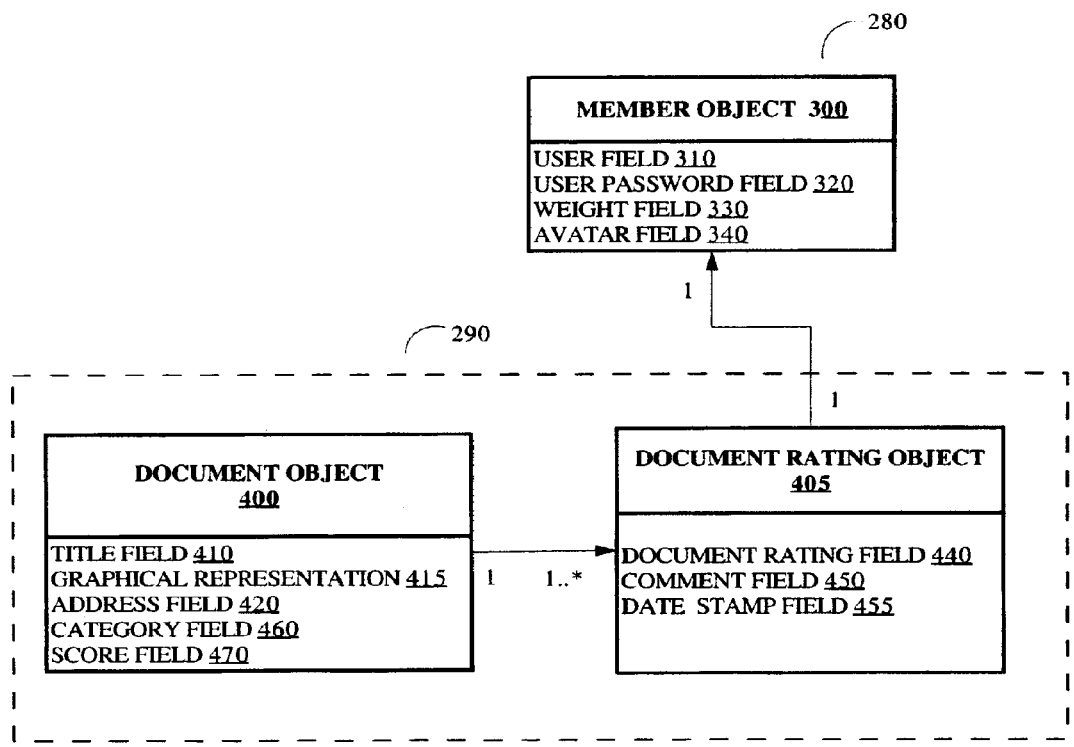
FIG. 4 is a schematic illustration of a rating record.

The rating and optionally the comment is then forwarded to the central server at step 550. Referring to FIGS. 2 and 4, at the central server 260, if a document object 400 does not exist that corresponds to the electronic document being rated, a new document object 400 is created and the title and URL address or URI address of the electronic document being rated is placed in the title field 410 and address field 420 of the document object 400, respectively. The central server 260 uses the log in information provided at step 510 to associate the new document rating object 405 with the member object 300 of the user who rated the electronic document. Additionally, a graphical representation of the electronic content can be stored in the graphical representation field 415. A document rating object 405 is created and associated with the document object 400 and the member object 300 corresponding to the user that has provided the rating. The rating is then inserted in the document rating field 440 of the document rating object 405 and any comment provided by the user is inserted in the comment field 450 of the document rating object 405. Optionally, a time and/or date the rating was made can be inserted in the date stamp field 455.

However, if a document object 400 that corresponds to the electronic document being rated already exists, then the existing document object 400 corresponding to the electronic document being rated is obtained. A document rating object 405 is then created and the rating placed in the content rating field 440 of the new document rating object 405. The central server 260 uses the log in information, provided at step 510, to associate the new document rating object 405 with the member object 300 of the user or member who rated the electronic document. If the user provided a comment or review of the electronic document, the comment is inserted in the comment field 450. Typically, any field in the rating record 290 that is empty is ignored when it is evaluated so if no comment is provided, the comment field 450 is simply left empty. Optionally, a value indicating a time and/or date the rating was made can be inserted in the date stamp field 455.

Referring again to FIG. 5, the method 500 ends and the user can log off the central server 260 or alternatively go back to browsing web pages or other electronic content on the content servers.

In this manner, a user or member can rate a number of different electronic documents and a rating record 290 is created or updated by the central server 260 in the score database 270. Each rating record 290 indicates which members rated the electronic document and what that rating was along with any comment about the electronic the user might have made. As more and more members of the member set rate electronic documents such as web pages and other electronic content, more and more ratings are associated with a specific electronic document. In this manner, a large collection of ratings of an electronic document can accumulated in the score database 270 with a number of different members of the member set each subjectively rating each electronic document.

Figure 6:
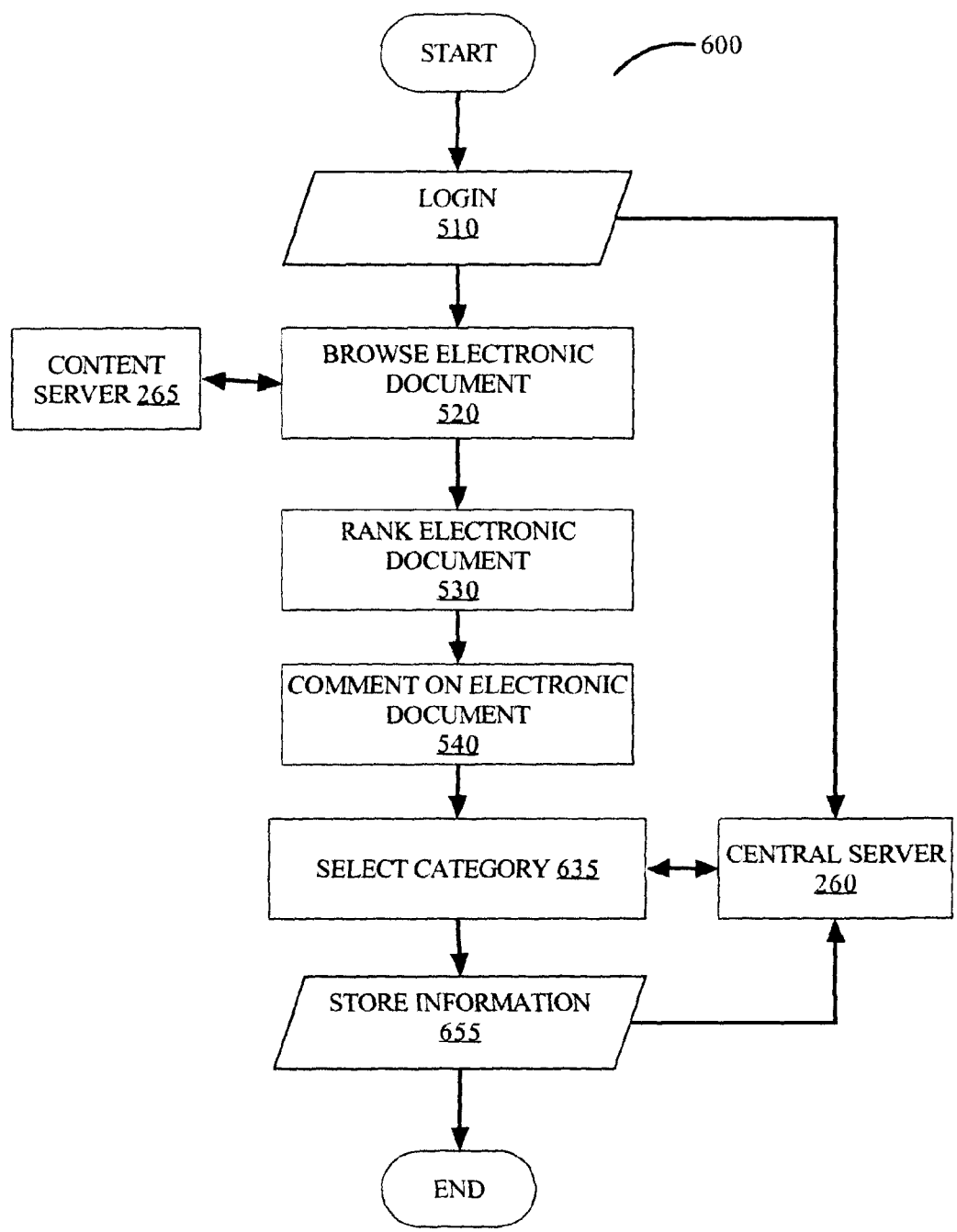
FIG. 6 is a flowchart of a method for a user to rate and categorize an electronic document the user has reviewed.

FIG. 6 illustrates a flowchart of a method 600 that varies slightly from method 500 illustrated in the flowchart in FIG. 5, in that it also allows a user to assign a category to the electronic document that he or she is ranking. In one aspect, if a member ranks an electronic document that has not yet been rated by one of the members in the member set, method 600 is used instead of method 500 illustrated in FIG. 5. In this method, steps 510, 520 530 and 540 are the same, however, an additional step 635 is added and step 655 is substituted in place of the previous step 550 so that the member rating an electronic document for the first time can assign the electronic document a category of subject matter that it falls within.

Step 635 has the user identify a category that the electronic document that is being ranked falls into. For example, the user may be presented with a list of categories they may choose from (i.e. sports, funny, games, technology, cooking, etc.) and the user may choose one of the provided categories that he or she believes the electronic document may fall into. Alternatively, step 635 may simply allow a user to enter a text string giving the user free reign to enter a category of their definition. Additionally, the user may be presented with a mix of these two options where he or she may be presented with a list of categories they may choose from in addition to allowing them to add another category if none of the presented categories seems sufficient to them.

At step 655 the information including the chosen category is provided to the central server and the central server 260 adds the information to the category field 460 of the document object 400 corresponding to the electronic document being rated and the rating to the document rating field 440 of the newly created document rating object 405 along with associating the newly created document rating object 405 with the member object 300 of the member that provided the rating.

Rating Other Members in the Member Set

Each member in the member set will rate electronic documents based on their own subjective opinions of the electronic document. Because each member rates the electronic documents subjectively, different users will often give the same electronic document different ratings. In many cases these ratings may be similar, but often different members may give the same electronic document very different ratings. As the members of the member set get to know how specific members review and/or rate content, the other members can rate that member. A member can identify another member in the members set and provide a rating of this other member. How a member of the member set is rated by other members will then affect how their ratings of electronic documents is factored into the overall rating of the electronic documents.

Figure 8:
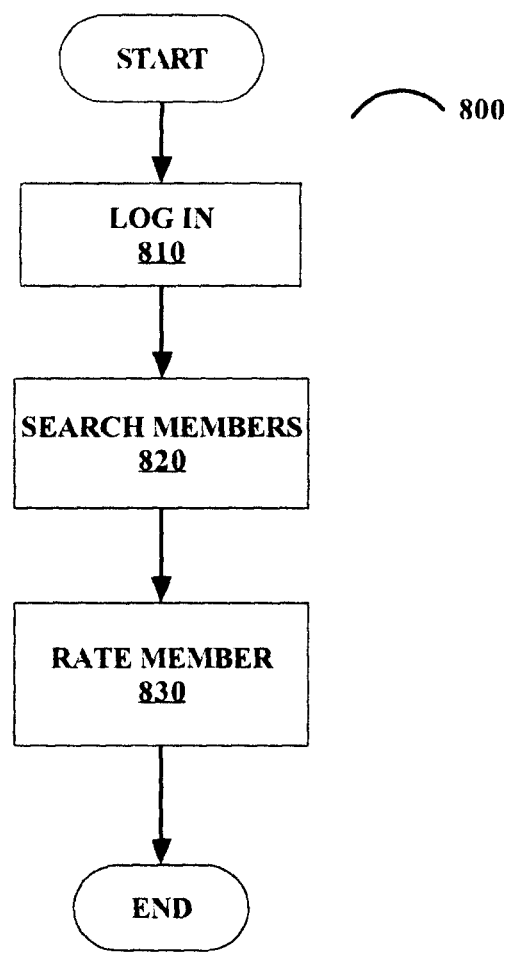
FIG. 8 is a flowchart of a method for a user to rank another member in the membership set.

FIG. 8 illustrates a flowchart of method 800 which allows a member to rate another member in the member set. Method 800 comprises the steps of: logging in 810; searching for a member 820; and rating the member 830.

The method 800 begins and the user logs into the central server at step 810. The log in typically involves the member providing a unique username and password to the central server to allow the central server to retrieve the member record from the database associated with the member.

At step 820, the member is able to search the list of members to locate a member they are interested in rating. Typically, the member is able to enter the name of the member in a search field and the central server 260 will display possible matches of members that the member can then select from.

At step 830, the member can select another member in the member set and rate that selected member. Again, this rating can be of a number of different types, however, in one aspect it is again a rating on a scale from 0 to 10 with 0 being the lowest rank and 10 being the highest rank. Referring to FIG. 3, the rating is then stored in a user rating object 350 in a user rating field 360. The user rating object 350 defines the association between the member providing the rating and the other member he or she is rating. This rating is later used to determine the weight in the weight field 330 of the member object 300.

In this manner, a member of the member set can rate a number of other members based on their previous comments and ratings of electronic documents or by their personal association with other members. This rating is stored in a user rating field 360 of a user rating object 350. For example, if a member likes the comments of another member and agrees with his or her ratings of one or more electronic documents, the user member may rare this member highly. Alternatively, a member may dislike or disagree with another member's comments and/or rating of one or more electronic documents and therefore give that member a lower rating.

Determining the Weighted Ratings of the Members

In addition to each member being able to rate other members in the member set, each members ratings of electronic documents are weighted by a weight factor based on how the other members in the member set rated that member. And not only are other member's subjective opinions of a member's ratings and/or reviews used to provide that member with his or her own weight factor that will affect that member's ratings of electronic documents, the weight factors determined for each of the members can also be used to weight the member's ratings of other members in the member set. In this manner, a rating of a member by a highly rated member of the member set will have more effect on that member's determined weight factor than a rating provided by a relatively lowly rated member of the member set.

Each member in the member set will have a weight factor determined for him or her that is based on the ratings of that member by other members in the member set. These ratings by other members will in turn be weighted based on the rating member's own determined weight factor which is in turn based on the weighted ratings of that member by other members. Referring to FIG. 3, the weight field 330 of a member's member object 300 contains the weight factor that has been determined for that member based on the weighted ratings of other members in the member set. Each rating of an individual member will be a based on the ratings given by other members to that user (i.e. the ratings contained in the user rating field 360 of the user rating objects 350) weighted by the weight factor determined for the rating member (i.e. the value contained in the weight field 330 of that rating members member object 300).

Figure 9:
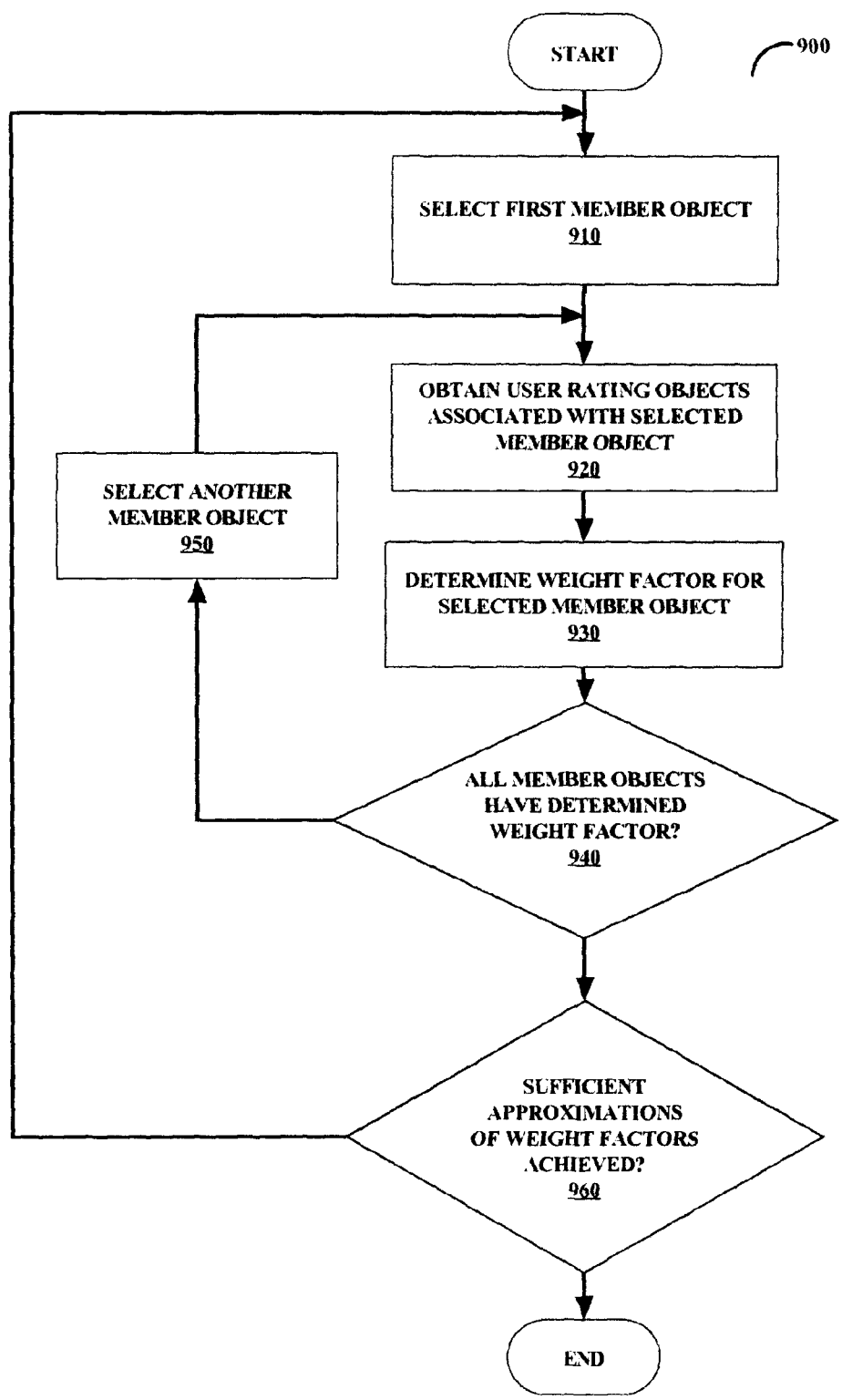
FIG. 9 is a flowchart of a method for setting the weights of the various members in a member set.

FIG. 9 illustrates a flowchart of method 900 of setting the weight factors of the various members in a member set. The method 900 comprises the steps of: selecting a first member object 910; obtaining all of the user rating objects associated with a selected member object 920; determining the weight factor for a selected member object 930; checking if any other member objects need to have a weight factor determined 940 and if so, selecting another member object 950 and repeating steps 910, 920, 930 for the next selected member object; iteratively determining weight factors for the member objects until a sufficient approximation of the weight factors has been achieved 960; and ending the method 900.

At step 910 a first member object is selected and all of the user rating objects associated with the selected member object are obtained at step 920. Referring to FIG. 3, each member object 300 is associated with a number of user rating objects 350; a user rating object 350 for each time another member has rated that member. Each user rating object 350 will be further associated with a member object 300 corresponding to the member that provided the rating.

Referring again to FIG. 9, at step 930, method 900 determines a weight factor for the selected member object which will be stored in the weight field. Referring to FIG. 3, the calculated weight factor is placed in the weight field 330 of the selected member object 300. This weight factor will be based on all of the ratings of the user by other members in the member set (the values contained in the user rating field 360 of the user rating objects 350) with each rating in the user rating field 360 weighted by the rating member's own determined weight factor (the value contained in the weight field 330 of the member object 300 corresponding to the member doing the rating).

In one aspect, the weight factor of a user, $w_y$, to be stored in the weight field 330 of the selected member object 300, where there are N number of user ratings objects 350 associated with the member object 300, is given by:

$$w_y = \frac{\sum_{x=1}^{N} f(w_x, r_x)}{\sum_{x=1}^{N} f(w_x)}$$

where $w_x$ is the weight factor determined for a member that has rated the member (i.e. the value contained in the weight field 330 of the member object 300 for that member); $r_x$ is the rating that the other member gave to the user (i.e. the value contained in the user rating field 360 of the user rating object 350 associated with that member's member object 300); and function $f(w_x, r_x)$ is the rating given to the user by a member weighted with the weight factor assigned to that member and taking into account the number of members who have rated the user.

The specific equation used may be varied depending on the goals and values that are desired to be optimized by the equation, such as median rating, whether the number of members who have rated the user should be taken into account, etc. However, in one aspect, using a rating system of 1 through 10 the equation used to determine the weight factor, $w_y$, could simply be the weighted mean as follows:

$$w_y = \frac{\sum_{x=1}^{N} w_x * r_x}{\sum_{x=1}^{N} w_x}$$

Referring again to FIG. 9, once a weight factor has been calculated for the selected member object at step 930, the method 900 checks to see if there are more member objects to have their weight factors determined at step 940. If weight factors need to be calculated for any more member objects, the next member object is selected at step 950 and steps 910, 920, 930 and 940 are repeated until a weight factor has been determined for each of the member objects.

At step 960, iteration is used to repeatedly solve for the weight factors of the members in the member set. The member set forms a complex network of inter-relations. Because weight factors of a member are a function of both the ratings of other members in the member set and of the weight factors of the members providing the ratings, recursive relationships between the members are formed. When a new weight factor is calculated or recalculated for one of the members, all of the weight factors of those members that have been rated by that member are also affected. In this manner, once a new weight factor is determined for a member in the member set, the weight factors of members rated by that member will be affected and the weight factors of other members will also have to be updated using that members newly determined weight factor. These members recalculated weight factors will also affect the weight factors of any other members these members have rated making it desirable to update these other member's weight factors.

The steps of the method 900 are iteratively repeated until a sufficient level of convergence is reached. What is considered a sufficient level of convergence will depend upon how precise the final calculated weight factors of the members is desired.

The first time the method 900 is run by the central server 260 on the member records 280, a seeding value is used for the member weight factors. Periodically, method 900 is run on the member objects 300 to take into account new ratings of members or changes to the ratings by members. Additionally, a member's rating of another member may have a finite period that is used before it is removed to prevent stale ratings from affecting a users rating unfairly. Referring to FIG. 3, the date stamp 370 of a user rating object 350 may be examined periodically to remove the user rating object 350 if a predetermined period of time has passed since the rating was made.

Determining Scores for Rated Electronic Documents

Once weight factors have been determined for the members using method 900 shown in FIG. 9, the ratings the members have assigned to electronic documents can be used along with the weight factors of the members who provided the ratings to determine a score for the electronic documents.

Figure 10:
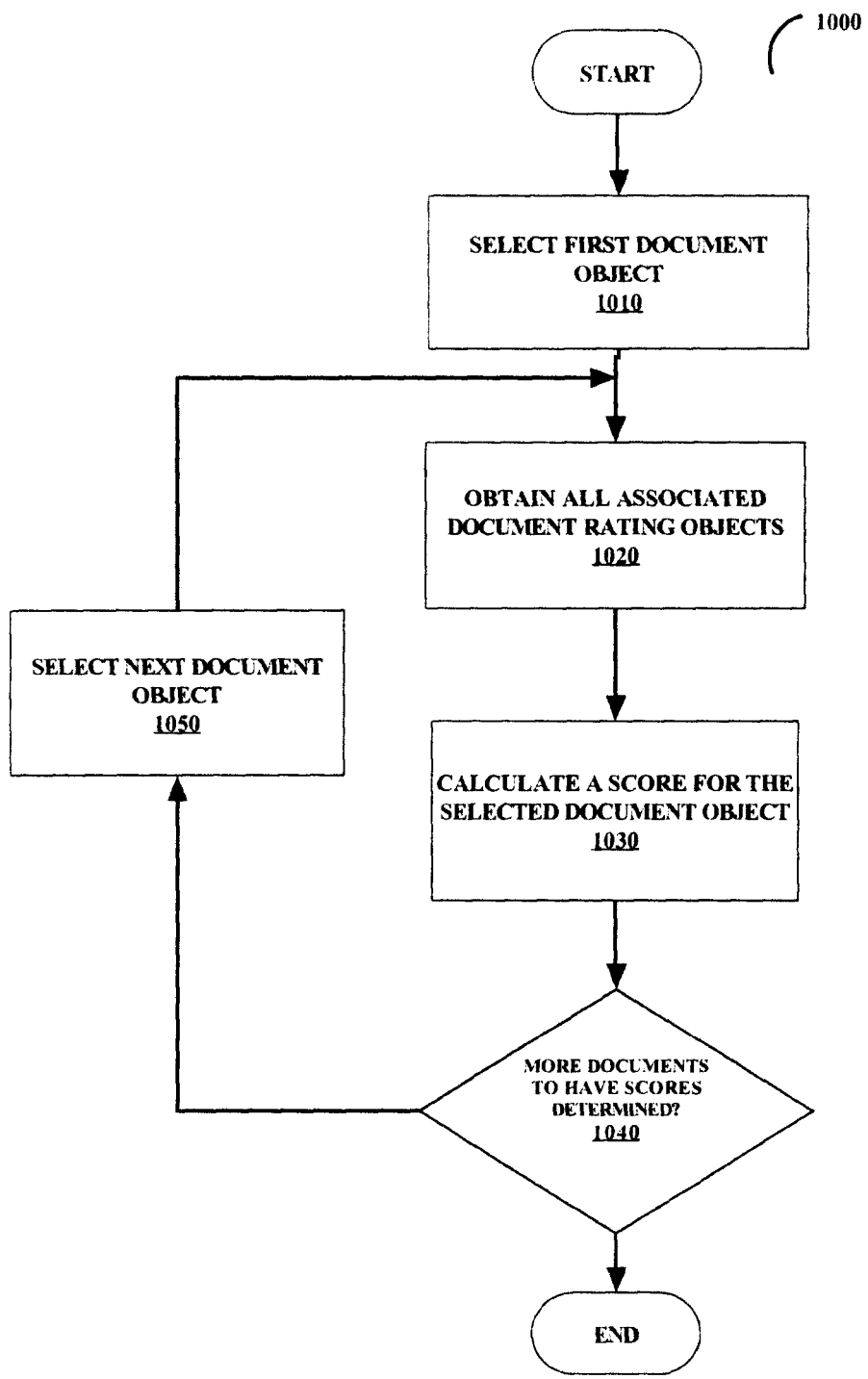
FIG. 10 is a flowchart of a method for calculating score values for electronic documents based on the weighted ratings of the electronic documents.

FIG. 10 illustrates a flowchart of a method 1000 for calculating a score value for electronic documents rated by a member. The method 1000 comprises the steps of: selecting a first document object 1010; obtaining all of the associated document rating objects for the selected document object 1020; calculating a score for the document object 1030; checking if more electronic documents need to have scores calculated for them 1040; selecting the next document object 1050 and repeating steps 1020, 1030, 1040 and 1050 until scores for all of the document objects have been determined.

Referring to FIGS. 4 and 10, at step 1010 a first document object 400 representing an electronic document is selected and the document rating objects 405 associated with the selected document object 400 are obtained at step 1020.

A score for the document object is then calculated at step 1030. The score for each document object 400, which will be contained in the score field 470, is a function of the ratings of the electronic document provided by the members in the member set (the value in the document rating field 440 of the document rating object 405) with each rating weighted by the weight factor determined for the member making the rating (the value in the weight field 330 of the member object 300 associated with the document rating object 405).

In one aspect, the score, S, for an electronic document, y, is a weighted average of the ratings provided by members and given by the equation:

$$S_y = \frac{\sum_{x=1}^{N} w_x * r_x}{\sum_{x=1}^{N} w_x}$$

where $r_x$ is the rating that the member gave to the page (i.e. the value contained in the document rating field 440 of the document rating object 405) and $w_x$ is the weight factor determined for the member that has rated the page (i.e. the value contained in the weight field 330 of the member object 300 for that member).

Once a score has been calculated for a selected document object 400 at step 1030, method 1000 checks to determine if more electronic documents need to have a score determined for them at step 1040 and if there are, another document object 400 is selected at step 1050 and steps 1020, 1030 and 1040 are repeated for the next document object 400.

Once all the document objects 400 are updated with scores, method 1000 ends. In this manner, scores are calculated for electronic documents that have been rated by members in the member set.

Generally, method 1000 is repeated periodically in order to keep the scores for the electronic documents, that have been rated by members in the member set, relatively up to date. Scores for electronic documents change as members provide new ratings of the electronic document. Additionally, as members rate other members the weight factors of the members who have rated the electronic documents change, causing the scores for the electronic documents these members have rated to change. Additionally, the ratings provided by members may be removed after a period of time to prevent stale ratings from affect the score determined for an electronic document. All of these factors will cause a score to change and periodic updating is needed to keep the scores relatively up to date.

Displaying a List of Search Results Along with their Scores

Figure 11:
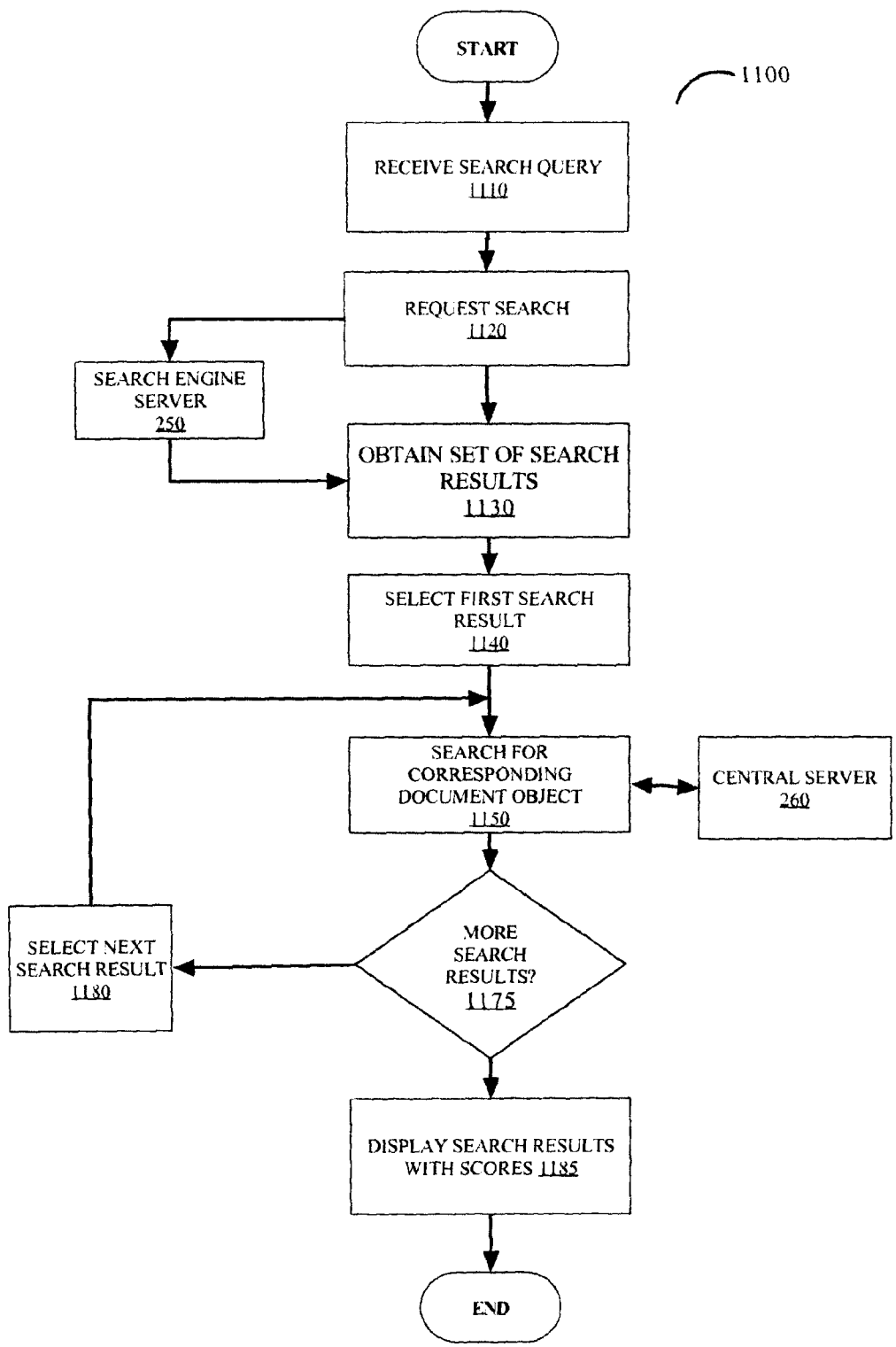
FIG. 11 is a flowchart of a method of obtaining a set of search results and displaying the search results with any score values determined for the electronic documents referenced by the search results.

FIG. 11 illustrates a flowchart of a method 1100 for displaying a set of search results along with any scores that have been determined for electronic documents referenced by the search results. Method 1100 comprises the steps of: receiving a search string 1110; requesting a search 1120; obtaining a set of search results 1130; selecting a first search results 1140; searching for a document object corresponding to the selected search results 1150; checking if more search results remain 1175; selecting the next search results 1180; repeating steps 1150, 1175 and 1180 until no search results remain; and displaying the search results with any located scores 1185.

The method 1100 obtains a set of search results from a search engine, each search result in the set of search results referencing an electronic document, such as webpages, website or other electronic content, that corresponds in some way to the search query used to request the search. Any of the returned search results referencing an electronic document that has had a score determined for it, has the score displayed adjacent to the search result to indicate to a user what score the electronic document referenced by the search result received. As outlined above, the score determined for an electronic document is based on ratings of the electronic document by members of a member set with the ratings further weighted by a weight factor determined for the member doing the rating. The score can be determined using methods 500 or 600 illustrated in FIGS. 5 and 6, respectively, to obtain ratings of the electronic document by members. User ratings of the members by other members can be obtained using method 800 illustrated in FIG. 8. Each member's user ratings can then be used as illustrated in method 900 in FIG. 9 to set a weight factor for each member and then the weight factor determined for each member using method 900 can be used as with method 1000 as illustrated in FIG. 10 to obtain a score for the electronic document. The score for an electronic document is then displayed adjacent to a search result referencing the electronic document to provide a user that requested the search with a rating of located electronic documents that is independent from the ranking of the electronic documents assigned to the electronic document by the search engine.

Method 1100 begins and at step 1110 when a search query is received. Typically, a user inputs the search query that they would like used to search for related electronic documents into the data processing system 101. As is commonly known in the art, the search query typically consists of one or more words or search terms that the user believes are related to the contents of the electronic documents he or she is interested in. Typically, the search query can also contain operators such as "and", "or", "not", etc. that are used to indicate the relationship between the words or search terms in the search query.

At step 1120 a search is requested using the search query. Referring to FIG. 2 the data processing system 101 sends a request containing the search string to the search engine server 250. As is commonly known in the art, the search engine server 250 searches its search index for electronic document (typically webpages) that correspond to the search query based on the searching algorithm used by the search engine server 250. The search engine server 250 then determines a set of search results, where each search result in the set of search results references an electronic document that has been located in the search index using the search query. The set of search results is returned as an ordered list of search results. Each search result is ranked by the search engine server 250 using a ranking algorithm and the rank determined for each search result determines the order the search results in the list of search results.

Each search result in the set of search results references an electronic document. For example, if the electronic document is a webpage, the search result does not provide the actually webpage, but merely references the webpage allowing a user to access the webpage if they chose the search result. Each search result typically contains metadata describing the contents of the electronic document along with a title of the electronic document and a link to access the electronic document, such as a URL address or URI address indicating the location of electronic document on the internet.

Referring again to FIG. 11, at step 1130 the data processing system 101 receives the set of search results from the search engine server 250.

At step 1140 the method 1100 selects a first search result from the set of search results and at step 1150 the method 1100 checks whether a score has been determined for the electronic document referenced by the selected search result. Referring to FIG. 2, the method 1100 accesses the central server 260 which in turn accesses the score database 270 and the document records 290 contained in the database 270. Referring to FIG. 4, the document records 290 are checked to see if any of the document objects 400 correspond to the electronic document referenced by the selected search result. Typically, the URL address or URI address contained in the selected search result is transmitted to the central server 260 to be used to compare to the URL addresses or URI addresses stored in the address fields 420 of the document objects 400 to determine if any of the document objects 400 correspond to the selected search results. If one of the document objects 400 contained in the score database 270 matches the selected search results, than any score contained in the score field 470 of the matching document object 400 is obtained and associated with the search result. The score in the score field 470 is sent back to the data processing system 101 running the method 1100.

Referring again to FIG. 11, at step 1175 the method 1100 checks to determine whether there are more search results remaining in the set of search results returned from the search engine server 250 and if there are more search results to be examined, the method 1100 selects the next search result at step 1180 and steps 1150, 1175 and 1180 are repeated as long as there are search results remaining in the set of search results. Each search result is checked at step 1150 for a corresponding document object 400 and the score obtained for any search results referencing an electronic document that has had a score determined for it.

At step 1175 when there are no more search results remaining in the set of search results, each search result referencing an electronic document that has had a score determined for it has obtained the score, method 1100 moves on to step 1185 and the set of search results are displayed along with any located scores. The set of search results are typically displayed in a list (as is commonly known in the art) with the search results in the order provided by the search engine 250 with any score associated with a search result positioned adjacent the search result so that a user can identify which scores are related to which search results.

Displaying the Search Results with Located Scores

Figure 12:
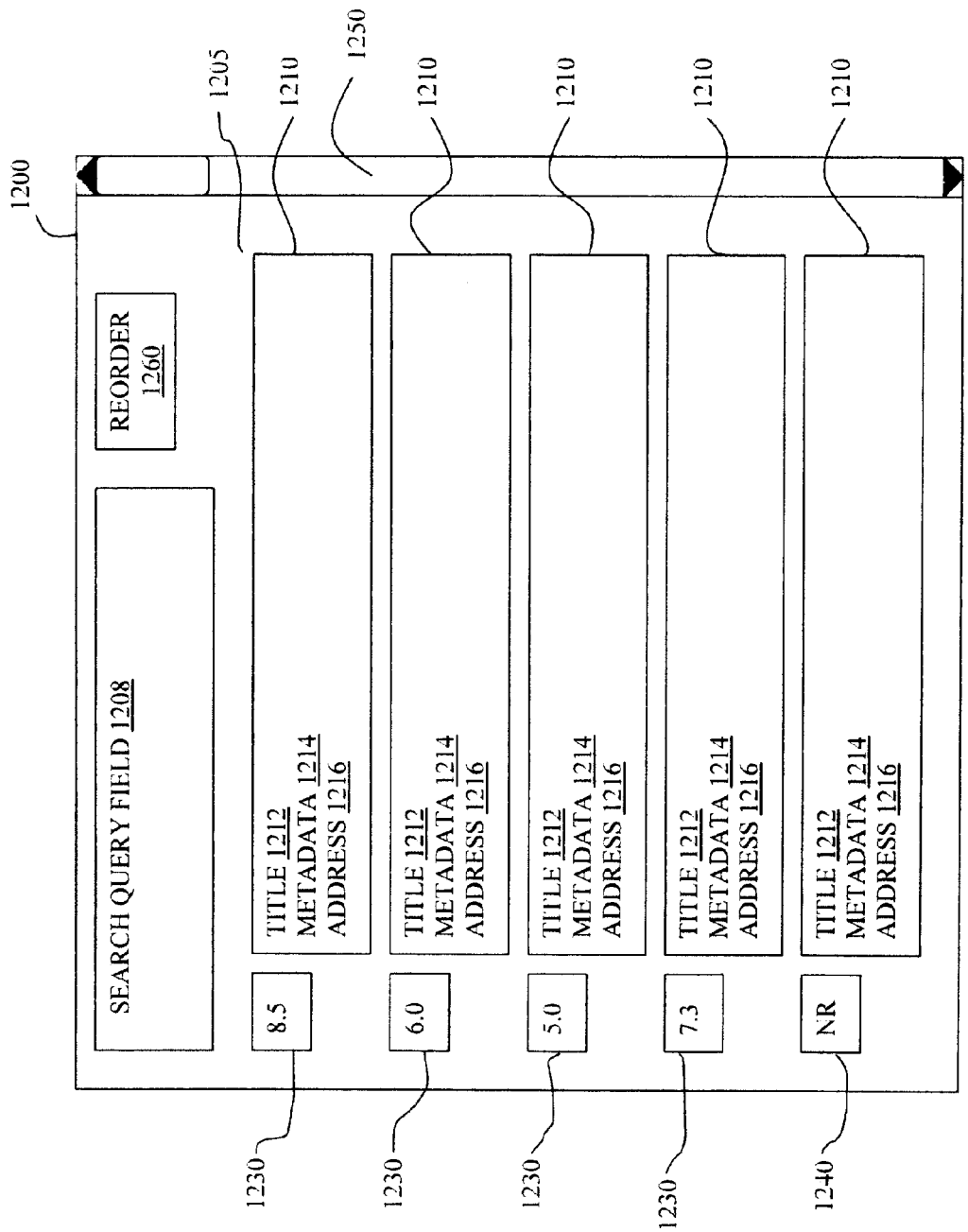
FIG. 12 is a schematic view of a screen shot displaying search results along with score values for the electronic documents referenced by the search results.

FIG. 12 is a schematic illustration of a screen shot of an interface 1200 displaying a list of search results 1205 along with any score in a score indicator 1230 that has been determined for the search results 1210 in one aspect of step 1185 of method 1100 shown in FIG. 11.

A search query input field 1208 is provided at the top of the interface 1220 to allow a user to input a new search query and request a new search to be conducted using the new search query.

A list of search results 1205 from a previously requested search returned from a search engine is provided. The list of search results 1205 contains a number of search results 1210 with a score value indicator 1230 positioned adjacent to any search result 1210 that has had a score value determined for them. Each search result 1210 references an electronic document such as a webpage or other electronic content that was located in the search. As is commonly known in the art, a user can select any of the search results 1210 (typically using a mouse and pointer to click on the search result 1210) in order to access the electronic document referenced by the search results 1210. The user selecting a search result 1210 usually results in the user navigating to the electronic document referenced by the selected search result 1210. Typically, the list of search results 1205 is longer than a single screen so a scroll bar 1250 is typically provided to allow a user to scroll through the list of search results 1205.

Each search result 1210 in the list of search results 1205 typically has a title 1212, metadata 1214 and a URL address 1216. The title 1212 displays the title of the electronic document referenced by the search result 1210. For example, if the electronic document is a webpage, the title 1212 displays the title of the webpage. If the electronic document is an image or graphic, the title 1212 can display a title for the image or movie or the filename of the image or movie. The metadata 1214 typically displays information about the electronic document referenced by the search result 1210. The information typically describes the contents of the electronic document to the user to allow the user to decide whether they would like to access the electronic document referenced by the search result 1210. If the electronic document is a webpage, the metadata 1214 can be a metatag for the webpage providing a summary of the contents of the webpage. The address 1216 provides the location of the electronic document, so that the electronic document can be accessed. Typically, the address 1216 indicates the URL address of the located electronic document.

The list of search results 1205 is ordered and each search result 1210 in the list of search results 1205 is displayed in the order which was determined by the search engine server 250 that provided the list of search results 1205. The order of the search results 1210 in the list of search results 1205 is based on the ranking of the electronic documents referenced by the search result 1210 that was determined by the search engine server 250.

For any search result 1210 referencing an electronic document for which a score has been determined, a score indicator 1230 is displayed with the search result 1210. The score indicator 1230 displays the score determined for the electronic document referenced by the adjacent search result 1210. The scores in the score indicators 1230 for the different search results 1210 are obtained using method 1100 illustrated in FIG. 11. As discussed above, the score for the electronic document is based on user ratings assigned to the electronic document made by the members of a member set with the user rating assigned to the electronic document further weighted by a weight factor associated with the member providing the user rating. In FIG. 12, the score is a number in a scale from one (1) to ten (10), however, a different scoring value system could also be used. In FIG. 12, each score indicator 1230 is displayed adjacent to the associated search result 1210 with the score indicator 1230 being placed on one side, however, the score indicator 1230 could be displayed to any side of the associated search results 1210 or merged within the contents of the search result 1210.

For search results 1210 where no score was determined or located for the referenced electronic document, a null indication 1240 can be shown indicating that the search result 1210 does not have a score associated with it. In FIG. 12, an "NR" or "not rated" is shown to indicate that no score was located for the electronic document referenced by a search result 1210, however, any number of different indicators could be used to inform a user that there is no corresponding score for the referenced electronic document.

In this manner, a user can request a search for electronic documents, such as webpages, from a search engine server 250 such as Google™, Yahoo! Search™, Excite™, etc. As is known in the art, a list of search results 1205 will be returned from the search engine server 250 with each search result 1210 referencing a webpage or other electronic document located on the Internet. Each search result 1210 in the list of search results 1205 will have been ranked and ordered by the search engine server 250 before being sent to the data processing system 101. As is known in the art, the ranking and order determined by the search engine server 250 will depend upon the ranking algorithm employed by the search engine server 250. The webpage or electronic document is ranked by the search engine based on a number of different criteria. For example, if the electronic document is a webpage, typically one of these criteria used by the ranking algorithm of the ranking by the search engine server 250 is based on the number of occurrences of the search terms in the metatag of the webpage or the content of the webpage itself. Another criteria is typically whether the domain name of the webpage contains search terms from the search string. Any number of other criteria could also be used including sponsorship of the search, i.e. the owner of the webpage paying a fee to the search engine to rank their webpage higher. The search results 1210 are ordered in the list of search results 1205 based on the ranking of the search results 1210 by the search engine server 250. In the interface 1200, the original ordering of the list of search results 1205 by the search engine server 250 is maintained. Any score determined for an electronic document referenced by a search result 1210 is displayed with the search result 1210 in a score indicator 1230.

In this manner, a user can see how other people have rated the search result 1210, with their ratings being weighted based on how the person providing the rating was rated by other people. Not only does a user get to see how the search engine server 250 ranks the search results 1210 based on the order returned, the user also gets to see a score determined for the search results 1210 that is independent of the ranking algorithm used by the search engine server 250 and rather than being based on some objective measurements of the electronic document, the score is based on subjective ratings of the electronic document provided by people, all while utilizing a third party search engine server 250 to obtain search results.

Reordering List Based on

A user can also reorder the list of search results 1205 so that the search results are reordered based on the score indicator 1230. The list of search results 1205 will be reordered based on the score indicated in the score indicator 1230. In one aspect, reorder button 1260 can be selected by a user to reorder the list of search results 1205 based on the score shown in the score indicator 1230.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A method for displaying a score with a search result, the method comprising:
  requesting a search from a search engine using a search query having at least one search term;
  receiving a set of search results from the search engine in response to the search query, each search result referencing an electronic document, the set of search results in an order of ranking determined by the search engine;
  displaying the set of ranked search results in the order of ranking determined by the search engine; and
  while the set of ranked search results are displayed in the order of ranking determined by the search engine, displaying at least one score along with the set of search results, each score associated with an electronic document referenced by one of the search results and displayed with the one of the search results,
  wherein each score is determined independently from the ranking of the search results by the search engine and the search query, and wherein each score is based on at least one rating value subjectively assigned to the associated electronic document by a member of a member set other than the user, wherein each rating value is weighted by a weight factor assigned to the member who assigned the rating value, with the weight factor assigned to a member being based on user ratings assigned to the member by other members of the member set, where each user rating used to determine the weight factor for a member is weighted by the weight factor determined for the member assigning the user rating and wherein the weight factors for members are determined by iteration before the at least one score is determined;

and wherein the at least one score is determined and associated with the electronic document before the search is requested from the search engine.

2. The method of claim 1 wherein each rating value used to determine one of the at least one score is weighted by a weight factor assigned to the member who assigned the rating value.

3. The method of claim 2 wherein the weight factor assigned to a member is based on user ratings assigned to the member by other members of the member set.

4. The method of claim 3 wherein each user rating used to determine the weight factor for a member is weighted by a weight factor determined for the member assigning the user rating.

5. The method of claim 4 wherein the weight factors for members are determined by iteration before the at least one score is determined.

6. The method of claim 1 wherein the electronic documents are webpages.

7. The method of claim 1 further comprising reordering the set of search results based on the at least one score.

8. The method of claim 5 further comprising reordering the set of search results based on the at least one score.

9. A computer readable memory having recorded thereon statements and instructions for execution by a data processing system to carry out the method of claim 1.

10. A data processing system for displaying a score with a search result, the data processing system comprising: at least one processor; a memory operatively coupled to the at least one processor; a display device operative to display data; and a program module stored in the memory and operative for providing instructions to the at least one processor, the at least one processor responsive to the instructions of the program module, the program module operative for:
  requesting a search from a search engine using a search query having at least one search term;
  receiving a set of search results from the search engine in response to the search query, each search result referencing an electronic document, the set of search results in an order of ranking determined by the search engine;
  displaying the set of search results in the order of ranking determined by the search engine on the display device; and
  while the set of ranked search results are displayed in the order of ranking determined by the search engine, displaying at least one score along with the set of search results on the display device, each score associated with an electronic document referenced by one of the search results and displayed with the one of the search results, wherein each score is determined independently from the ranking of the search results by the search engine and the search query, and wherein each score is based on at least one rating value subjectively assigned to the associated electronic document by a member of a member set other than a user of the data processing system,
  wherein each rating value is weighted by a weight factor assigned to the member who assigned the rating value, with the weight factor assigned to a member being based on user ratings assigned to the member by other members of the member set, where each user rating used to determine the weight factor for a member is weighted by the weight factor determined for the member assigning the user rating and wherein the weight factors for members are determined by iteration before the at least one score is determined;

and wherein the at least one score is determined and associated with the electronic document before the search is requested from the search engine.

11. The data processing system of claim 10 wherein each rating value used to determine one of the at least one score value is weighted by a weight factor assigned to the member who assigned the rating value.

12. The data processing system of claim 11 wherein the weight factor assigned to a member is based on user ratings assigned to the member by other members of the member set.

13. The data processing system of claim 12 wherein each user rating used to determine the weight factor for a member is weighted by the weight factor determined for the member assigning the user rating.

14. The data processing system of claim 13 wherein the weight factors for members are determined by iteration before the at least one score is determined.

15. The data processing system of claim 10 further comprising reordering the set of search results based on the at least one score.

16. The data processing system of claim 14 further comprising reordering the set of search results based on the at least one score.

17. A method of associating scores determined for electronic documents with search results obtained from a search engine that reference the electronic documents, the method comprising:
  providing a database storing scores determined for electronic documents; obtaining a set of search results, the set of search results obtained from a search engine using a search query having at least one search term, each search result referencing an electronic document; and
  for each search result in the set of search results, searching the database for any score determined for the electronic document referenced by the search result and: while the set of ranked search results are displayed in the order of ranking determined by the search results, if a score has been determined for the electronic document referenced by the
  search result obtaining the score value and associating the score with the search result; wherein the database is independent from the search engine, and wherein each score is based on at least one rating value subjectively assigned to the associated electronic document by a member of a member set other than a person providing the search query,
    wherein each rating value is weighted by a weight factor assigned to the member who assigned the rating value, with the weight factor assigned to a member being based on user ratings assigned to the member by other members of the member set, where each user rating used to determine the weight factor for a member is weighted by the weight factor determined for the member assigning the user rating and wherein the weight factors for members are determined by iteration before the at least one score is determined;

and wherein the at least one score is determined and associated with the electronic document before the search is requested from the search engine.

18. The method of claim 17 wherein each rating value used to determine one of the at least one scores is weighted by a weight factor assigned to the member who assigned the rating value.

19. The method of claim 18 wherein the weight factor assigned to a member is based on user ratings assigned to the member by other members of the member set.

20. The method of claim 19 wherein each user rating used to determine the weight factor for a member is weighted by the weight factor determined for the member assigning the user rating.

21. The method of claim 20 wherein the weight factors for members are determined by iteration before the scores are determined.

22. The method of claim 21 wherein the electronic documents are webpages.

23. A computer readable memory having recorded thereon statements mad instructions for execution by a data processing system to carry out the method of claim 21.

* * * * *